(12) United States Patent
Volpin et al.

(10) Patent No.: US 10,350,989 B2
(45) Date of Patent: Jul. 16, 2019

(54) FLAP DEVICE

(71) Applicant: JOHNSON ELECTRIC INTERNATIONAL AG, Murten (CH)

(72) Inventors: Davide Volpin, Shatin (HK); Claudio Provenzano, Shatin (HK)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 241 days.

(21) Appl. No.: 14/600,767

(22) Filed: Jan. 20, 2015

(65) Prior Publication Data

US 2015/0202954 A1   Jul. 23, 2015

(30) Foreign Application Priority Data

Jan. 20, 2014   (IT) .......................... TO2014U000007

(51) Int. Cl.
*F01P 5/02* (2006.01)
*F01P 5/04* (2006.01)
*F01P 5/06* (2006.01)
*B60K 11/08* (2006.01)
*F01P 11/10* (2006.01)

(52) U.S. Cl.
CPC .............. *B60K 11/085* (2013.01); *F01P 5/02* (2013.01); *F01P 5/04* (2013.01); *F01P 5/06* (2013.01); *F01P 11/10* (2013.01); *F01P 2005/046* (2013.01)

(58) Field of Classification Search
CPC ........ F01P 5/02; F01P 5/04; F01P 5/06; F01P 11/10; B60K 11/085
USPC ......................................................... 454/333
See application file for complete search history.

(56) References Cited

U.S. PATENT DOCUMENTS

| | | | | |
|---|---|---|---|---|
| 4,090,434 A | * | 5/1978 | Krisko .................... | F24F 13/26 454/264 |
| 4,766,807 A | * | 8/1988 | Davis .................. | F24F 13/1406 137/601.06 |
| 5,305,787 A | * | 4/1994 | Thygesen ............. | F16K 15/033 137/527 |
| 6,106,228 A | * | 8/2000 | Bartlett .................... | F01P 11/10 123/41.11 |
| 7,077,742 B2 | * | 7/2006 | Stevenson ............. | B60H 1/249 454/259 |
| 7,669,557 B2 | * | 3/2010 | Kojima .................. | B60H 1/322 123/41.11 |
| 2004/0002298 A1 | * | 1/2004 | Osada .................. | B60H 1/3421 454/155 |

(Continued)

*Primary Examiner* — Steven B McAllister
*Assistant Examiner* — Allen R Schult
(74) *Attorney, Agent, or Firm* — Muncy, Geissler, Olds & Lowe, P.C.

(57) ABSTRACT

A flap device for a heat exchanger of a vehicle has a support structure in which is formed a passage. A shutter is fitted to the passage, pivotable about an operationally horizontal axis (X-X) nearer to a first end of the shutter, between a rest position in which it closes the passage and a operating position in which it opens the passage, thereby allowing a flow of air to pass in a predetermined direction through the passage. In use, the shutter pivots from the rest position towards the operating position under the effect of a flow of air which strikes it in this direction, and returns by gravity towards the rest position when the air flow ceases. A stop projection formed on the first end of the shutter strikes an abutment surface on the structure when the shutter reaches the rest position.

15 Claims, 4 Drawing Sheets

(56) References Cited

U.S. PATENT DOCUMENTS

| | | | | |
|---|---|---|---|---|
| 2009/0098819 A1* | 4/2009 | Lambrecht | ............ | F24F 13/18 |
| | | | | 454/333 |
| 2010/0320015 A1* | 12/2010 | Banhegyi | ............... | B60K 6/387 |
| | | | | 180/65.21 |
| 2012/0255827 A1* | 10/2012 | Lechner | ................... | F01P 5/04 |
| | | | | 192/58.4 |
| 2014/0242902 A1* | 8/2014 | Ali | ......................... | F24F 13/14 |
| | | | | 454/359 |
| 2015/0163957 A1* | 6/2015 | Martinez-Cruz | ........................... | |
| | | | | H05K 7/20009 |
| | | | | 454/184 |
| 2016/0272060 A1* | 9/2016 | Edwards | ............. | B60K 11/085 |

* cited by examiner

FLAP DEVICE

CROSS REFERENCE TO RELATED APPLICATIONS

This non-provisional patent application claims priority under 35 U.S.C. § 119(a) from Utility Model Application No. TO 2014 U 000007, filed in Italy on Jan. 20, 2014, the entire contents of which are hereby incorporated by reference.

FIELD OF THE INVENTION

This invention relates to a flap device for a fan unit of a heat exchanger of a motor vehicle.

BACKGROUND OF THE INVENTION

More specifically, the invention relates to a flap device comprising: a support structure in which is formed a passage in which a tab-like shutter or flap is fitted pivotally about an operationally horizontal axis nearer to a first end of the shutter, between a lowered rest position in which it closes the passage and a raised operating position in which it opens the passage, thereby allowing a flow of air to pass in a predetermined direction through the passage. The arrangement being such that, in use, the shutter or flap pivots from the lowered rest position towards the raised operating position under the effect of a flow of air which strikes it in this direction, and returns by gravity towards the rest position when the air flow ceases. The shutter or flap having at least one support part intended to strike against associated stop surface of the support structure when the shutter or flap reaches the rest condition.

FIG. 1 of the attached drawings shows an electric fan unit 1 for a heat exchanger (a radiator) of a motor vehicle. This fan unit comprises a plate-like support structure or cowl 2, having a circular opening 3 in which an electric fan, indicated as a whole by 4, is fitted.

In a known way, the electric fan 4 comprises an electric motor, not visible in FIG. 1, the rotor of which is coupled to a rotary fan or impeller 5 comprising a central hub 6 from which there extends a plurality of curved blades 7, the distal ends of which are joined to a peripheral ring 8.

In the embodiment illustrated by way of example in FIG. 1, the support structure or cowl 2 has, at its corners, respective flap devices indicated collectively by 9, each including a respective essentially rectangular passage 10 which is associated with a tab-like shutter or flap 11 of essentially rectangular shape.

In each flap device 9, the tab-like shutter or flap 11 is pivotable about an operationally horizontal axis X-X, between a lowered rest condition, shown in FIGS. 1 and 3, in which it closes the associated passage 10, and a raised operating position (shown partially in broken lines in FIG. 3) in which it opens the associated passage 10, thereby allowing a flow of air to pass in a predetermined, essentially horizontal, direction through the passage. The pivot axis X-X of each shutter or flap 11 is nearer a first end 11a thereof.

The arrangement is such that, in use, the shutter or flap 11 pivots from the lowered rest position towards a raised operating position under the effect of a flow of air which strikes it in the aforesaid predetermined direction, and returns by gravity towards the rest position when this air flow ceases.

In the prior art solution, to which FIGS. 2 and 3 of the attached drawings refer, the other or second end 11b of the shutter or flap 11, farther from the axis X-X, has a stop element indicated by 11c in FIG. 3, intended to strike against an associated abutment surface 2a of the support structure or cowl 2 when the shutter or flap 11 reaches the rest condition.

The first end 11a of the shutter or flap 11 has an edge 12 (FIGS. 2 and 3) which, in the rest condition, faces and is spaced apart from a portion 2b of the supporting structure or cowl 2 (FIG. 3) which forms one side of the opening or passage 10.

In use, the shutters or flaps 11 of the devices 9 of FIG. 1 tend to move from the rest position to the open operating position under the action of air flows which strike them as a result of the forward movement of the motor vehicle. When these flows cease, in other words when the motor vehicle slows down and stops, these shutters or flaps return to the closed rest position under the effect of gravity.

With the known solution described above, the shutters or flaps generate an annoying closing noise, for example when the engine is switched off and the driver and any passengers leave the motor vehicle and close its doors.

This problem affects not only motor vehicles having conventional thermal engines, but also motor vehicles having purely electric or hybrid traction systems requiring cooling fans for radiators, battery packs, etc. Such flap devices may be used with fan units have fans driven by the engine of the vehicle.

SUMMARY OF THE INVENTION

Hence there is a desire for a flap device which can overcome the drawback of the prior art solutions described above.

This and other objects are achieved according to the invention with a flap device of the type specified above, primarily characterized in that at least one stop projection is formed in the aforesaid first end of the shutter or flap, near the pivot axis or on the support structure so as to contact the first end in the closed position.

In one embodiment, the aforesaid first end of the shutter or flap has an edge which, in the rest condition, faces and is spaced apart from a portion of the supporting structure or cowl which forms one side of the aforesaid passage, and at said edge the shutter or flap has at least one stop projection, which is intended to strike against a stop in the supporting structure or cowl and is suitably nearer the pivot axis of the shutter or flap, as a result of which this impact takes place at a markedly lower velocity. The impact then creates a noise whose intensity is correspondingly reduced, and is practically negligible.

Accordingly, in one aspect thereof, the present invention provides a flap device for a support structure of a fan unit of a heat exchanger of a motor vehicle, comprising: a passage formed in the support structure; a tab-like shutter pivotally fitted to the support structure about an operationally horizontal axis nearer to a first end of the shutter, between a lowered rest position in which the shutter closes the passage and a raised operating position in which the shutter opens the passage, thereby allowing a flow of air to pass in a predetermined direction through the passage; at least one stop projection formed on one of the aforesaid first end of the shutter and the support structure and arranged to bear against an abutment surface formed on the other of the aforesaid first end of the shutter and the support structure when the shutter is in the rest position, wherein, in use, the shutter pivots from the lowered rest position towards the raised operating position under the effect of a flow of air which strikes it in said direction, and returns by gravity towards the rest position when said air flow ceases, causing the stop projection to contact the abutment surface.

Preferably, the first end of the shutter has an edge which, in the rest position, faces and is spaced apart from a portion of the supporting structure which forms one side of said passage; the shutter having at least one stop projection at said edge, intended to strike against said portion of the supporting structure to define the lowered rest position of said shutter.

Preferably, the shutter has two stop projections formed thereon.

Preferably, the stop projection is integrally formed with the shutter as a monolithic structure.

Preferably, the stop projection is resiliently deformable.

Preferably, the stop formation is hollow.

According to a second aspect, the present invention provides a support structure of a fan unit for a heat exchanger, comprising: an opening arranged to receive a fan; a passage through the support structure; and the flap device, as above, arranged to allow air to flow through the passage in one direction only.

According to a third aspect, the present invention provides a fan unit for a heat exchanger of a vehicle, comprising: a support structure having an opening and a passage for the passage of air: a fan arranged in the opening; and the flap device, as above, with the shutter arranged to allow air to flow through the passage in one direction only.

Preferably, the fan is an electric fan.

Preferably, there are a plurality of passages, each with a respective flap device.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
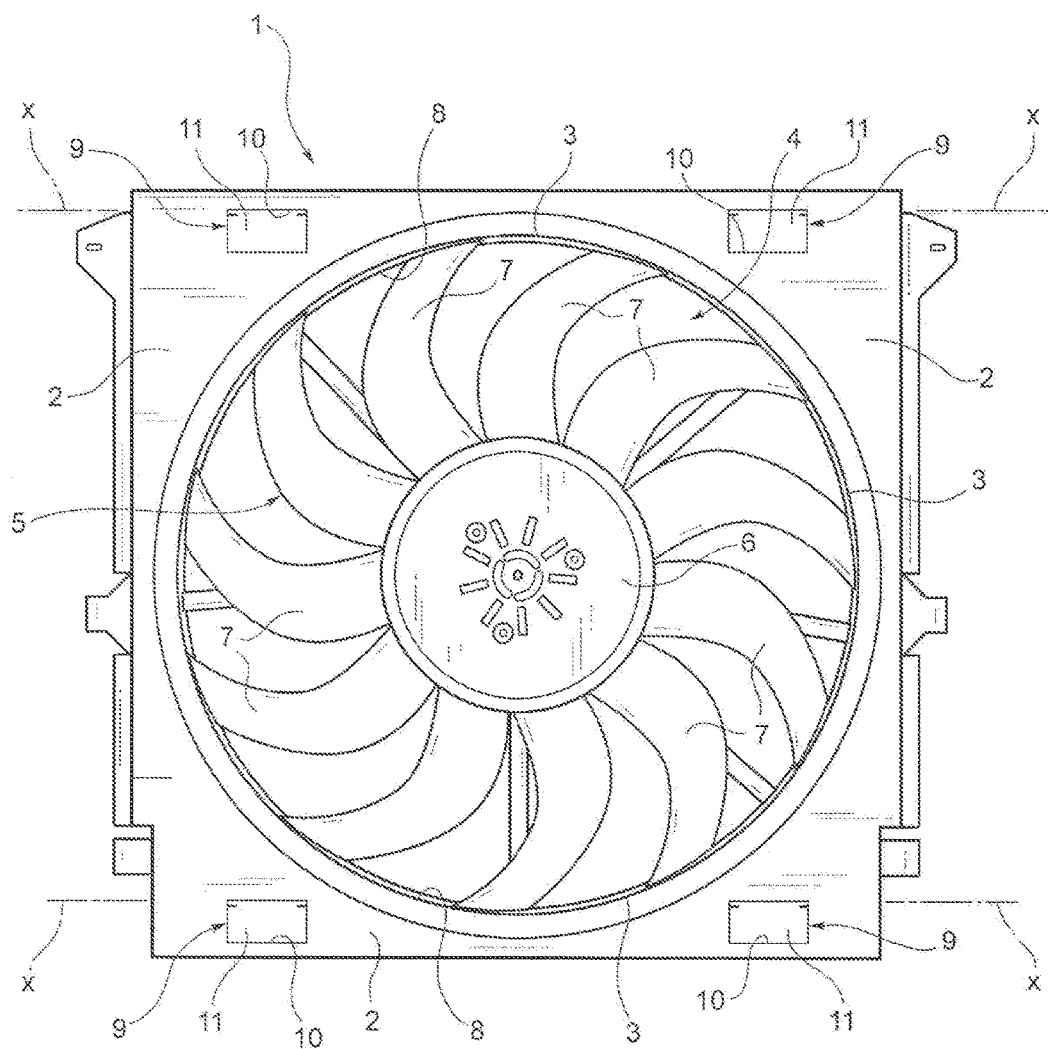
FIG. 1, described above, is a front view of an electric fan unit comprising a plurality of flap devices.
Figure 3:
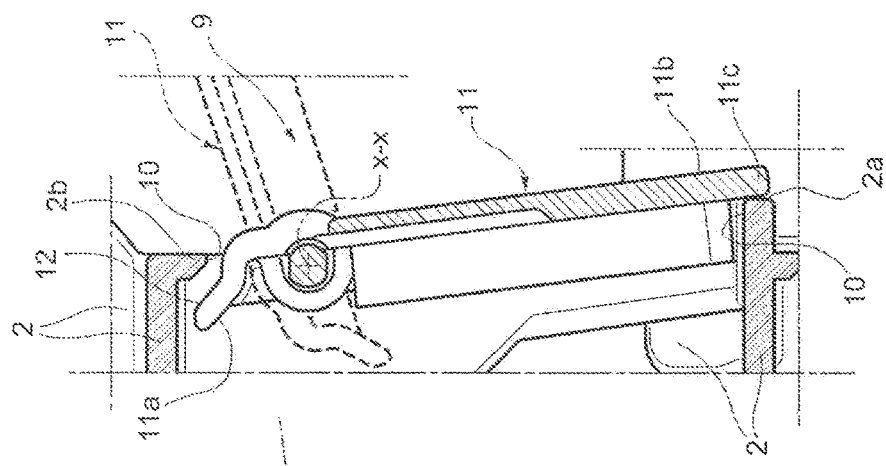
FIG. 3, also described above, is a sectional view taken along the line III-III of FIG. 2.
Figure 2:
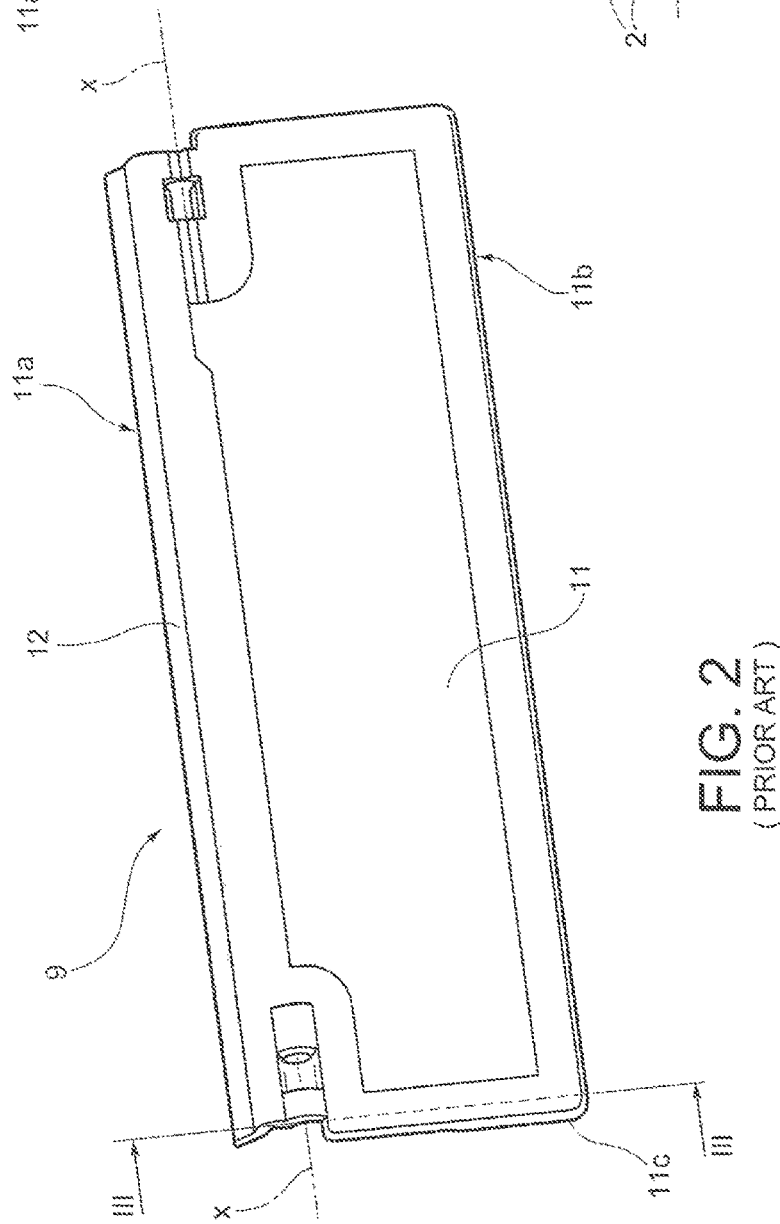
FIG. 2, described above, shows the shutter or flap of a prior art device.
Figure 4:
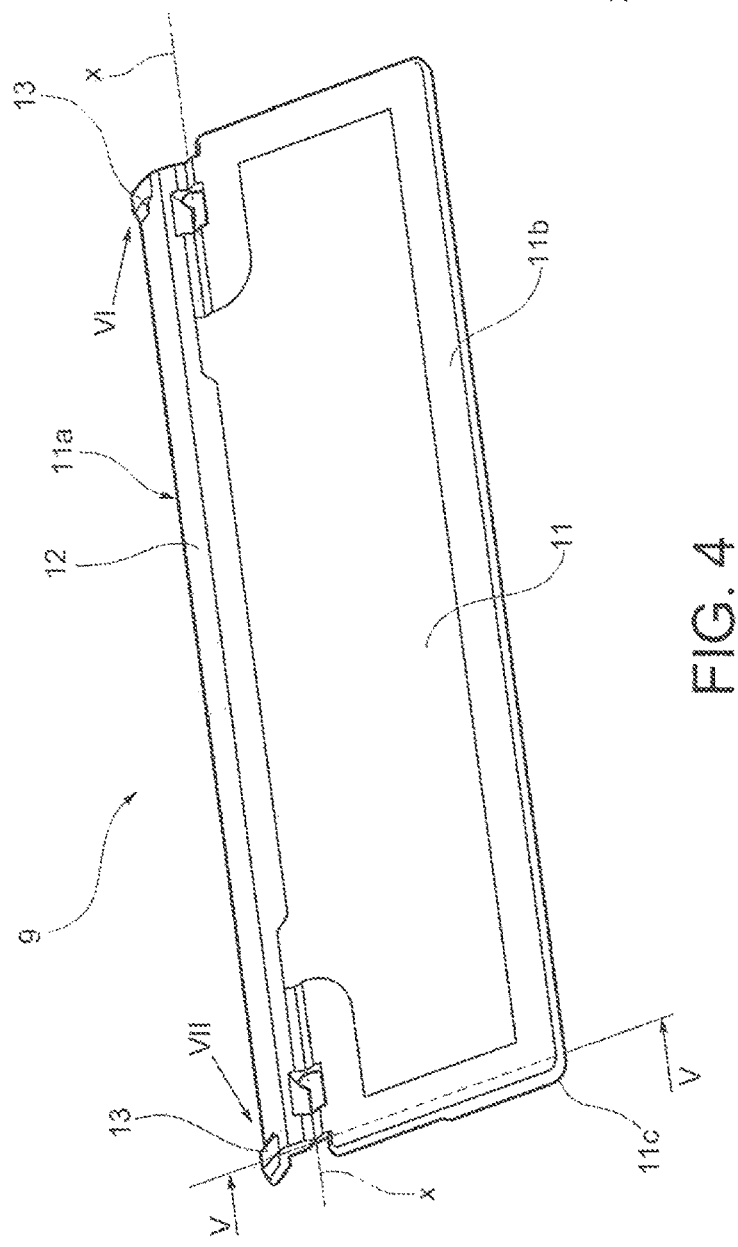
FIG. 4 is a front perspective view of the shutter or flap of a device according to the present invention.

FIGS. 4 to 7 show a flap device 9 according to the present invention. In these figures, parts and elements identical or corresponding to parts and elements described previously have been given the same reference numerals as those used previously.

Figure 5:
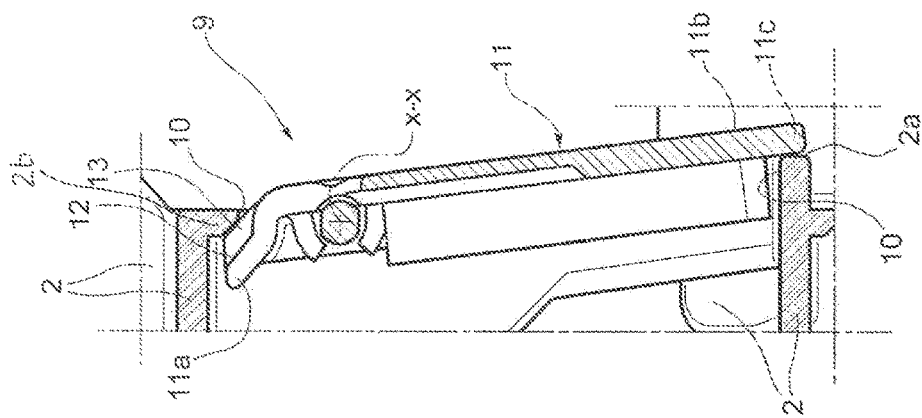
FIG. 5 is essentially a sectional view taken along the line V-V of FIG. 4.
Figure 6:
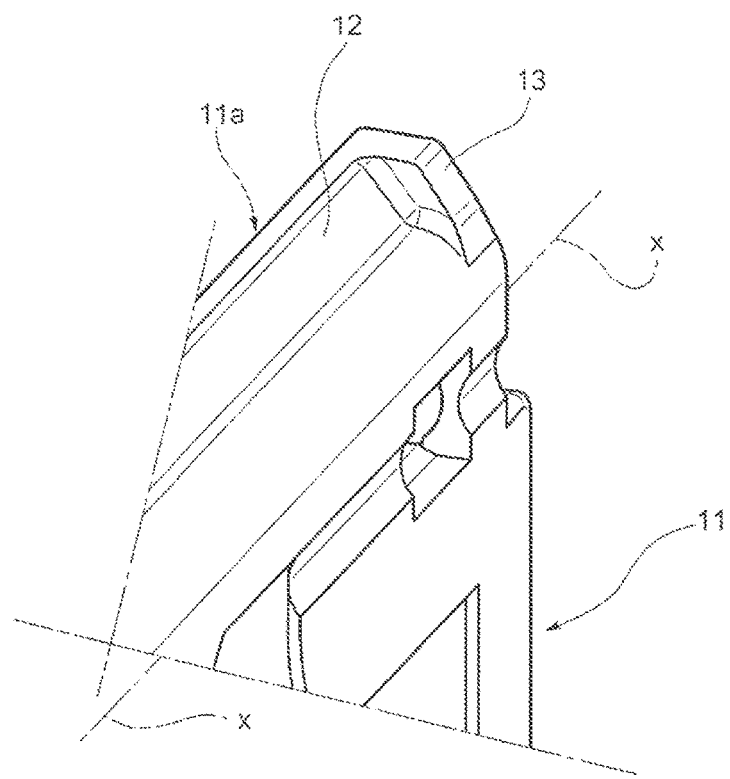
FIGS. 6 and 7 are partial, perspective views showing two details indicated by VI and VII respectively in FIG. 4.
Figure 7:
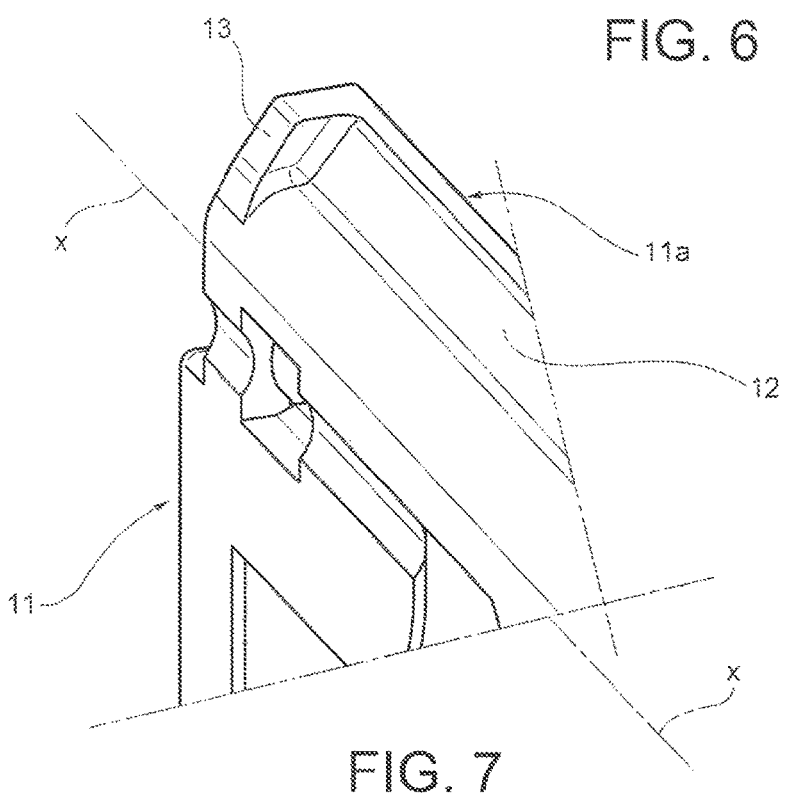

In the solution according to the present invention, at least one stop projection 13 is provided at the edge 12 of the aforesaid first end 11a of the shutter or flap 11, and is preferably made in one piece with the shutter or flap 11 itself (see, in particular, FIGS. 5 to 7).

In the illustrated embodiment, the edge portion 12 of the end 11a of the flap 11 which is nearer to the axis X-X has two stop projections 13, one at each of its ends.

These stop projections 13 are made in such a way that they strike against the portion 2b of the supporting structure or cowl 2 when the shutter or flap 11 reaches the lowered rest position. In fact, it is the bearing of the stop projections 13 against the portion 2b of the supporting structure or cowl 2 that defines the rest position of the shutter or flap 11. Portion 2b thus forms an abutment surface against which the stop projections bear.

As is apparent from FIG. 5, when the flap 11 is in the lowered rest condition, its second end 11c is slightly spaced apart from the corresponding formation 2a of the supporting structure or cowl 2.

In other words, in the solution according to the present invention, the stop projection or projections 13 bear against the portion 2b of the support structure 2 before the second end 11c of the shutter or flap 11 can strike against the portion 2a of the support structure.

Since the distance between the stop projection or projections 13 and the axis X-X is markedly smaller than the distance separating this axis X-X from the point at which the second end 11c of the shutter or flap 11 struck against the formation 2a in the prior art devices, the circumferential velocity of the impact of the shutter or flap 11 against the supporting structure 2 is markedly reduced. Thus, there is a corresponding reduction in the intensity of the noise generated.

Additionally, the or each stop projection may be hollow or otherwise formed to provide a degree of resilient deformability to the stop projections to still further lower the noise generated by the stop projections coming into contact with the corresponding abutment surface.

Naturally, provided that the principle of the invention is retained, the forms of application and the details of embodiment may be varied widely from what has been described and illustrated purely by way of example and without restrictive intent, the invention extending to all embodiments which achieve the same usefulness by using the same innovative principle. For example, the stop projections may be formed on the portion 2b of the support structure and arranged to strike against an abutment surface formed on the first edge 12 of the shutter.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A flap device for a support structure of a fan unit of a heat exchanger of a motor vehicle, comprising:
   a passage formed in the support structure; and
   a shutter pivotally fitted to the support structure about an operationally horizontal axis, between a lowered rest position in which the shutter closes the passage and a raised operating position in which the shutter opens the passage, thereby allowing an air flow to pass in a predetermined direction through the passage, wherein the shutter has two opposite ends in an extending direction of the shutter, the two opposite ends comprising a first end near to the horizontal axis and a second end far from the horizontal axis, wherein two protrusions are integrally formed on a surface of the first end of the shutter facing the support structure, and arranged to bear against an abutment surface formed on the support structure when the shutter is in the rest position, a distance between each protrusion and the horizontal axis is smaller than a distance between the second end of the shutter and the horizontal axis, wherein, in use, the shutter pivots from the lowered rest position towards the raised operating position under an effect of the air flow, and returns by gravity towards the lowered rest position when the air flow ceases, causing the protrusions to contact the abutment surface, wherein, when the shutter returns by gravity and each protrusion contacts the abutment surface, the second end is spaced apart from a corresponding formation of the support structure to avoid an impact from the second end to the corresponding formation, wherein the two protrusions are respectively formed at two ends of the first end along a direction parallel to the horizontal axis, and each protrusion is integrally formed with the shutter as a monolithic structure, and wherein, when the protrusions contact the abutment surface, and area of the shutter between the horizontal axis and the second end does not contact the corresponding formation of the support structure.

2. The flap device of claim 1, wherein the first end of the shutter has an edge which, in the rest position, faces and is spaced apart from a portion of the supporting structure which forms one side of the passage; the two protrusions are formed on the edge and intends to strike against the portion of the supporting structure to define the lowered rest position of the shutter.

3. The flap device of claim 1, wherein each protrusion is resiliently deformable.

4. The flap device of claim 3, wherein each protrusion is hollow.

5. A flap device for a support structure of a fan unit of a heat exchanger of a motor vehicle, comprising:

a passage formed in the support structure; and a shutter pivotally fitted to the support structure about an operationally horizontal axis, between a lowered rest position in which the shutter closes the passage and a raised operating position in which the shutter opens the passage, thereby allowing an air flow to pass in a predetermined direction through the passage, wherein the shutter has two opposite ends in an extending direction of the shutter, the two opposite ends comprising a first end near to the horizontal axis and a second end far from the horizontal axis, wherein two protrusions are integrally formed on a surface of the first end of the shutter facing the support structure, and arranged to bear against an abutment surface formed on the support structure when the shutter is in the rest position, wherein a distance between each protrusion and the horizontal axis is smaller than a distance between the second end of the shutter and the horizontal axis, wherein, when the shutter returns from the raised operating position by gravity towards the lowered rest position, the protrusion bears against the abutment surface first to avoid an impact from the second end to a corresponding formation of the support structure, wherein the two protrusions are respectively formed at two ends of the first end along a direction parallel to the horizontal axis, and each protrusion is integrally formed with the shutter as a monolithic structure, and wherein, when the protrusions contact the abutment surface, and area of the shutter between the horizontal axis and the second end does not contact the corresponding formation of the support structure.

6. The fan unit of claim 5, wherein there are only two protrusions integrally formed on a surface of the first end of the shutter facing the support structure, to bear against the abutment surface formed on the support structure when the shutter is in the rest position.

7. The fan unit of claim 5, wherein the two protrusions extends substantially perpendicularly from the surface of the first end of the shutter.

8. The fan unit of claim 5, wherein the two protrusions are respectively arranged at outermost edges of the first end of the shutter along the direction parallel to the horizontal axis, and each protrusion has a side surface aligned with a side surface of the first end of the shutter.

9. The fan unit of claim 5, wherein there is a contact surface inclined with respect to a vertical direction between each protrusion and the support structure.

10. A fan unit for a heat exchanger of a vehicle, comprising:

a support structure having an opening and a passage for the passage of air;

a fan arranged in the opening; and the flap device of claim 5 with the shutter arranged to allow air to flow through the passage in one direction only.

11. The fan unit of claim 10, wherein the fan is an electric fan.

12. The fan unit of claim 10, wherein the support structure comprises a plurality of the passages and a plurality of the flap devices.

13. The fan unit of claim 10, wherein the first end of the shutter has an edge which, in the rest position, faces and is spaced apart from a portion of the supporting structure which forms one side of the passage; the two protrusions are formed on the edge and intends to strike against the portion of the supporting structure to define the lowered rest position of the shutter.

14. The fan unit of claim 10, wherein each protrusion is resiliently deformable.

15. The fan unit of claim 10, wherein each protrusion is hollow.

* * * * *